United States Patent
Yamine et al.

(10) Patent No.: US 9,955,327 B2
(45) Date of Patent: Apr. 24, 2018

(54) ACCELERATED RE-ESTABLISHMENT OF EMERGENCY CALLS

(71) Applicant: TELEFONAKTIEBOLAGET LM ERICSSON (PUBL), Stockholm (SE)

(72) Inventors: Badawi Yamine, Beirut (LB); Torbjörn Wigren, Uppsala (SE); Iana Siomina, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/127,482

(22) PCT Filed: Mar. 20, 2014

(86) PCT No.: PCT/SE2014/050340
§ 371 (c)(1),
(2) Date: Sep. 20, 2016

(87) PCT Pub. No.: WO2015/142236
PCT Pub. Date: Sep. 24, 2015

(65) Prior Publication Data
US 2017/0142567 A1    May 18, 2017

(51) Int. Cl.
*H04M 11/04*    (2006.01)
*H04W 4/22*    (2009.01)
(Continued)

(52) U.S. Cl.
CPC ........... *H04W 4/22* (2013.01); *H04W 76/028* (2013.01); *H04W 4/02* (2013.01)

(58) Field of Classification Search
CPC ....... H04W 4/02; H04W 4/22; H04W 76/028; H04W 64/00; H04W 76/007; G08B 25/016; G08B 27/001; H04M 3/5116
(Continued)

(56) References Cited

U.S. PATENT DOCUMENTS

2011/0142207 A1*  6/2011  Goldman ............... G06Q 10/10
                                                         379/45
2011/0263219 A1   10/2011  Hasenfang et al.
(Continued)

FOREIGN PATENT DOCUMENTS

WO    2013046124 A1    4/2013

OTHER PUBLICATIONS

3GPP TS 23.271 V12.0.0 3rd Generation Partnership Project; Technical Specification Group Services and System Aspects; Functional stage 2 description of Location Services (LCS) (Release 12), Dec. 2013.
3GPP TS 23.271 V11.2.0 3rd Generation Partnership Project; Technical Specification Group Services and System Aspects; Functional stage 2 description of Location Services (LCS) (Release 11), Mar. 2013.
(Continued)

*Primary Examiner* — Timothy Pham
(74) *Attorney, Agent, or Firm* — Sage Patent Group

(57) ABSTRACT

A method for emergency call handling for a User Equipment (UE). A UE performs a first emergency call. The UE also transmits a first UE location report. Furthermore, the UE performs a second emergency call. The UE re-transmits the first UE location report when it is determined that a change in a UE location (since the transmission of said first UE location report) is below a threshold value. Alternatively, the UE re-transmits the first UE location report when it is determined that a time period set by a timer has not expired, wherein the time period set by this timer is set upon transmission of the first location report. Otherwise, the UE transmits a second UE location report.

11 Claims, 9 Drawing Sheets

(51) Int. Cl.
*H04W 76/02* (2009.01)
*H04W 4/02* (2018.01)

(58) Field of Classification Search
USPC ...................................................... 455/404.2
See application file for complete search history.

(56) References Cited

U.S. PATENT DOCUMENTS

2012/0129482 A1\* 5/2012 Li ..................... H04M 3/42195
455/404.1
2013/0203373 A1 8/2013 Edge

OTHER PUBLICATIONS

Kangas, et al., Chapter draft: Positioning in LTE Book: Position Location—Theory, Practice and Advances: A Handbook for Engineers and Academics, Jan. 12, 2011.

\* cited by examiner

ACCELERATED RE-ESTABLISHMENT OF EMERGENCY CALLS

This application is a 371 of International Application No. PCT/SE2014/050340, filed Mar. 20, 2014, the disclosure of which is fully incorporated herein by reference.

TECHNICAL FIELD

The present disclosure generally relates to emergency call handling. More particularly, this disclosure presents systems, network nodes, apparatuses, User Equipments (UEs), computer programs, etcetera, for emergency call handling in conjunction with an emergency call re-establishment.

BACKGROUND

Radio communication networks are widely deployed to provide various communication services such as telephony, video, data, messaging, broadcasts, and so on. Such radio communication networks support communications for multiple UEs by sharing the available network resources. The above-mentioned UEs may sometimes be referred to as wireless communication devices, communication devices, mobile terminals, terminals, user terminals (UTs), wireless terminals, wireless transmit/receive units (WTRUs), etc. One example of a radio communication network is the Universal Mobile Telecommunications System (UMTS), a third generation (3G) technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband Code Division Multiple Access (WCDMA), Time Division Code Division Multiple Access (TDCDMA), and Time Division Synchronous Code Division Multiple Access (TDSCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on WCDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). The complete network is called Evolved packet System (EPS).

UEs and the underlying radio communication networks are generally configured to support and facilitate emergency call handling, e.g. 911 calls and the like. In many countries (e.g. the U.S.) it is mandatory that the UE reports its location upon the subscriber (e.g. the user) establishes an emergency call. One example procedure is known from the 3GPP Technical Specification TS 23.271, V.11.2.0, section 9.1.5A. FIG. 9.4A of this section is reproduced in FIG. 1 and illustrates an example of UE location reporting during an emergency call establishment procedure. In other countries, the location of the UE may instead be requested at any time during the emergency call establishment. One example procedure is known from the same technical specification, section 9.1.5. FIG. 9.4 of this section is reproduced in FIG. 2 and illustrates an example of UE location reporting during an emergency call establishment procedure according to section 9.1.5 of the 3GPP TS 23.271, V.11.2.0. As is well-known among those persons skilled in the art, there exist various methods for establishing, or otherwise determining, the location (i.e. the position) of the UE. For example, chapter 32 of the reference book "Positioning in LTE, Handbook of Position Location, Theory Practice and Advances: A Handbook for Engineers and Academics" written by Ari Kangas, Iana Siomina, and Torbjörn Wigren and published by IEEE Press & Wiley in 2012, discloses some positioning methods.

Generally, the location of the UE will be determined and reported each time the subscriber (e.g. the user) establishes an emergency call. In general, the reporting of the location of the UE delays the emergency call establishment procedure to a certain degree. Also, the location determination (i.e. the positioning) of the UE per se causes a delay to the emergency call establishment procedure. The exact delay of the location determination may vary depending on which positioning method that is actually used.

To sum up, the UE location determination and reporting causes a delay to the emergency call handling. This delay becomes even more serious in situations where an emergency call is dropped, e.g. because of bad radio conditions. In such situation, the subscriber will generally have to perform a new emergency call. Performing a second emergency call following the first emergency call may be perceived as very inconvenient for the subscriber, since a subscriber making an emergency call generally wishes to get connected to the emergency center quickly and without any unnecessary delay.

In an attempt to improve the existing art, the U.S. Pat. No. 6,240,285 B1 suggests alternative carrier selection on repeat emergency calls. According to U.S. Pat. No. 6,240,285 B1, wireless telephone networks and other mobile radio services networks provide 911 or similar emergency calling services between mobile stations and a public safety answering point (PSAP). In emergency situations, the caller often will not be satisfied with the quality of the link to the PSAP, for any of a variety of subjective reasons. In such a case, the caller ends the first emergency call and initiates another emergency call. In accordance with U.S. Pat. No. 6,240,285 B1, if the caller initiates the second emergency call within a predetermined interval from the first call, the mobile station will select an alternate operating system of the network for the second call. For example, if the first call utilized an A-side cellular carrier, the handset will select a B-side or PCS carrier for the second call. The handset also may select a different technology, e.g. analog instead of the normally preferred digital, for the second emergency call. The expectation according to U.S. Pat. No. 6,240,285 B1 is thus that conditions will be different on the alternate operating system and provide a quality of service that the emergency caller subjectively finds more acceptable.

SUMMARY

It is in view of these considerations and others that the various embodiments of this disclosure have been made. It is a general object of the embodiments disclosed herein to provide an improved emergency call re-establishment. It would be particularly advantageous if the emergency call re-establishment is quicker than in the existing prior art. The general object of improving emergency call re-establishment is consequently addressed by the embodiments defined in the appended claims.

In accordance with an aspect disclosed herein, a method performed by a system for accelerating a re-establishment of an emergency call is provided. A first emergency call is received from a UE, e.g. via a Radio Access Network (RAN). Upon receiving the first emergency call, a start of an emergency call re-establishment timer is initiated. It is also monitored whether a second emergency call is received from the same UE during a time period, which is set by this emergency call re-establishment timer. In response to receiving the second emergency call from the same UE during said time period, it is determined whether a location of said UE is known to the system. If the location of the UE is known to the system, the second emergency call is accepted. Otherwise, i.e. if the location of the UE is not known to the system, a UE location request is transmitted. This UE location request is transmitted in order to request data related to the location of said UE. For example, the UE location request may be transmitted to the RAN.

The time period set by the emergency call re-establishment timer would generally be set to a relatively small value, e.g. of the order of seconds.

In one embodiment, the method comprises determining whether the location of the UE has already been reported along with the first emergency call. This determination may be performed in response to receiving the second emergency call from the same UE during the time period, which is set by the emergency call re-establishment timer. If the location of the UE has been reported along with the first emergency call, the second emergency call is accepted. Otherwise, if the location of the UE has not been reported along with the first emergency call, then the UE location request is transmitted.

The method may additionally comprise transmitting a UE location request for requesting the data related to the location of the UE upon expiry of the time period set by the emergency call re-establishment timer. That is, when the timer times out, the method continues by transmitting said UE location request for requesting the data related to the location of the UE.

In some embodiments, accepting the second emergency call comprises withdrawing from transmitting a UE location request.

In some embodiments, the method comprises comprising delaying a transmission of a UE location request for a pre-defined time period after receiving the second emergency call.

It should be appreciated that the above-mentioned system may be embodied as one single apparatus. In one example embodiment, the single apparatus may preferably (though not necessarily) be a Mobile Switching Center (MSC). In other embodiments, the above-mentioned system may be embodied as several, i.e. two or more, apparatuses that cooperate to perform the method steps, or actions. Thus, the above-mentioned method can be performed either by a single apparatus or by several apparatuses that cooperate in a distributed solution.

In accordance with another aspect disclosed herein, a system for accelerating a re-establishment of an emergency call is provided. The system comprises means adapted to receive a first emergency call from UE. Means adapted to initiate a start of an emergency call re-establishment timer upon receiving the first emergency call are also provided. Furthermore, the system comprises means adapted to monitor whether a second emergency call is received from the same UE during a time period set by the emergency call re-establishment timer. The system further comprises means adapted to determine whether a location of the UE is known to the system, e.g. in response to receiving a second emergency call from the same UE during the time period set by the emergency call re-establishment timer. Also, the system comprises means adapted to accept the second emergency call in response to the location of the UE being known to the system. Moreover, the system comprises means adapted to transmit, in response to the location of said UE not being known to the system, a UE location request for requesting data related to the location of said UE.

The time period set by the emergency call re-establishment timer would generally be set to a relatively small value, e.g. of the order of seconds.

In one embodiment, the system comprises means adapted to determine whether the location of said UE has already been reported along with said first emergency call in response to receiving the second emergency call from the same UE during said time period; means adapted to accept the second emergency call in response to the location of said UE having been reported along with said first emergency call; and means adapted to transmit, in response to the location of said UE not having been reported along with said first emergency call, a UE location request for requesting said data related to the location of said UE.

The system may also comprise means adapted to transmit, upon expiry of the time period set by the emergency call re-establishment timer, a UE location request for requesting data related to the location of said UE.

Also, the system may comprise means adapted to withdraw from transmitting a UE location request. Alternatively, or additionally, the system may comprise means adapted to delay a transmission of a UE location request for a pre-defined time period after the second emergency call is received.

Again, it should be appreciated that the above-mentioned system may be embodied as one single apparatus. In such embodiment, the various means listed hereinabove would be incorporated into or communicatively associated with the single apparatus. In one example embodiment, the single apparatus may preferably (though not necessarily) be a Mobile Switching Center (MSC). In other embodiments, the above-mentioned system may be embodied as several, i.e. two or more, apparatuses that cooperate. In such embodiments, the various means listed hereinabove would be incorporated into two or more apparatuses that are communicatively connectable to each other.

According to still another aspect disclosed herein, a computer program for assisting in accelerating a re-establishment of an emergency call is provided. The computer program comprises instructions which when executed on at least one processor of at least one apparatus causes the at least one apparatus to receive a first emergency call from a UE; initiate a start of an emergency call re-establishment timer upon receiving said first emergency call; monitor whether a second emergency call is received from the same UE during a time period set by the emergency call re-establishment timer; in response to receiving the second emergency call from the same UE during said time period determine whether a location of said UE is known to the apparatus; and in response to the location of said UE being known to the apparatus accept the second emergency call; otherwise, i.e. in response to the location of said UE not being known to the apparatus, causing the apparatus to transmit a UE location request for requesting data related to the location of said UE.

A carrier may comprise the computer program. This carrier may, for example, be one of an electronic signal, an optical signal, a radio signal, or a computer readable storage medium.

The various embodiments described hereinabove may provide several advantages. For instance, it is made possible to accelerate the emergency call re-establishment procedure by accepting the second emergency call from a certain UE during the time period set by the emergency call re-establishment timer when it has first been determined that the location of this certain UE is already known to the system. If the location of a certain UE is already known to the system and the emergency call re-establishment timer has not timed out (meaning that too much time has not yet lapsed since the first emergency call was received), then there is no (or at least very little) need for requesting data related to the location (or, position) of the UE once more. Thus, the second emergency call can be accepted. In other words, the second emergency call can be accepted without requesting data related to the location (or, position) of the UE. For example, in some embodiments it is withdrawn from transmitting any UE location request. In alternative embodiments, a transmission of a UE location request may instead be delayed for a pre-defined time period after the reception of the second emergency call. For example, this location request may be delayed until after the emergency call set-up has been finished.

In accordance with still another aspect disclosed herein, a method performed by a UE for assisting in accelerating a re-establishment of an emergency call is provided. A first emergency call is performed, or made. Also, a first UE location report is transmitted (e.g. to the RAN). This first UE location report may be transmitted upon request, e.g. upon a request from the Core Network (CN). A second emergency call is also performed, or made. This second emergency call may be performed due to the fact that the first emergence call failed. Next, the first UE location report is re-transmitted (e.g. to the RAN) in response to a determination that a change in a UE location since the transmission of the first UE location report is below a threshold value or in response to a determination that a time period set by a timer has not expired, wherein the time period set by the timer is set upon transmission of said first location report. Otherwise, i.e. in response to a determination that a change in a UE location since the transmission of the first UE location report is equal to or above the threshold value or in response to a determination that a time period set by a timer has expired, a second UE location report is transmitted (e.g. to the RAN).

In accordance with a further aspect disclosed herein, a UE for assisting in accelerating a re-establishment of an emergency call is provided. The UE comprises means adapted to perform a first emergency call; means adapted to transmit a first UE location report; means adapted to transmit a second emergency call; means adapted to determine whether a change in UE location since a transmission of the first emergency call is below a threshold value; means adapted to determine whether a time period set by a timer has expired, wherein the time period set by the timer is set upon transmission of a first location report; means adapted to re-transmit the first UE location report in response to a determination that a change in UE location since a transmission of a first emergency call is below said threshold value or in response to a determination that said time period set by the has not expired; and means adapted to transmit a second UE location report in response to a determination that a change in UE location since a transmission of a first emergency call is equal to or above said threshold value or in response to a determination that said time period set by the timer has expired.

In accordance with yet another aspect disclosed herein, a computer program for assisting in accelerating a re-establishment of an emergency call is provided. The computer program comprises instructions which, when executed on at least one processor of at least one apparatus causes the at least one apparatus to: perform a first emergency call; transmit a first UE location report; perform a second emergency call; re-transmit the first UE location report in response to a determination that a change in UE location since the transmission of the first UE location report is below a threshold value or in response to a determination that a time period set by a timer has not expired; otherwise transmit a second UE location report.

A carrier comprising the computer program may also be provided. This carrier may be one of an electronic signal, an optical signal, a radio signal, or a computer readable storage medium.

The various embodiments described hereinabove with respect to the UE-side may provide several advantages. For instance, it is made possible to accelerate the emergency call re-establishment procedure by only transmitting the second UE location report when this is deemed necessary. Otherwise, in situations when the UE has not changed its location above a threshold value (meaning that the UE location change is relatively small) or in situations when little time has elapsed since the first emergency call (meaning that the UE cannot possibly have changed its location very much) then the UE can simply re-transmit its previous first UE location report. By refraining from transmitting the second UE location report in such situations, the overall delay for emergency call re-establishment procedures can be reduced.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps (or actions) throughout the description.

Figure 1:
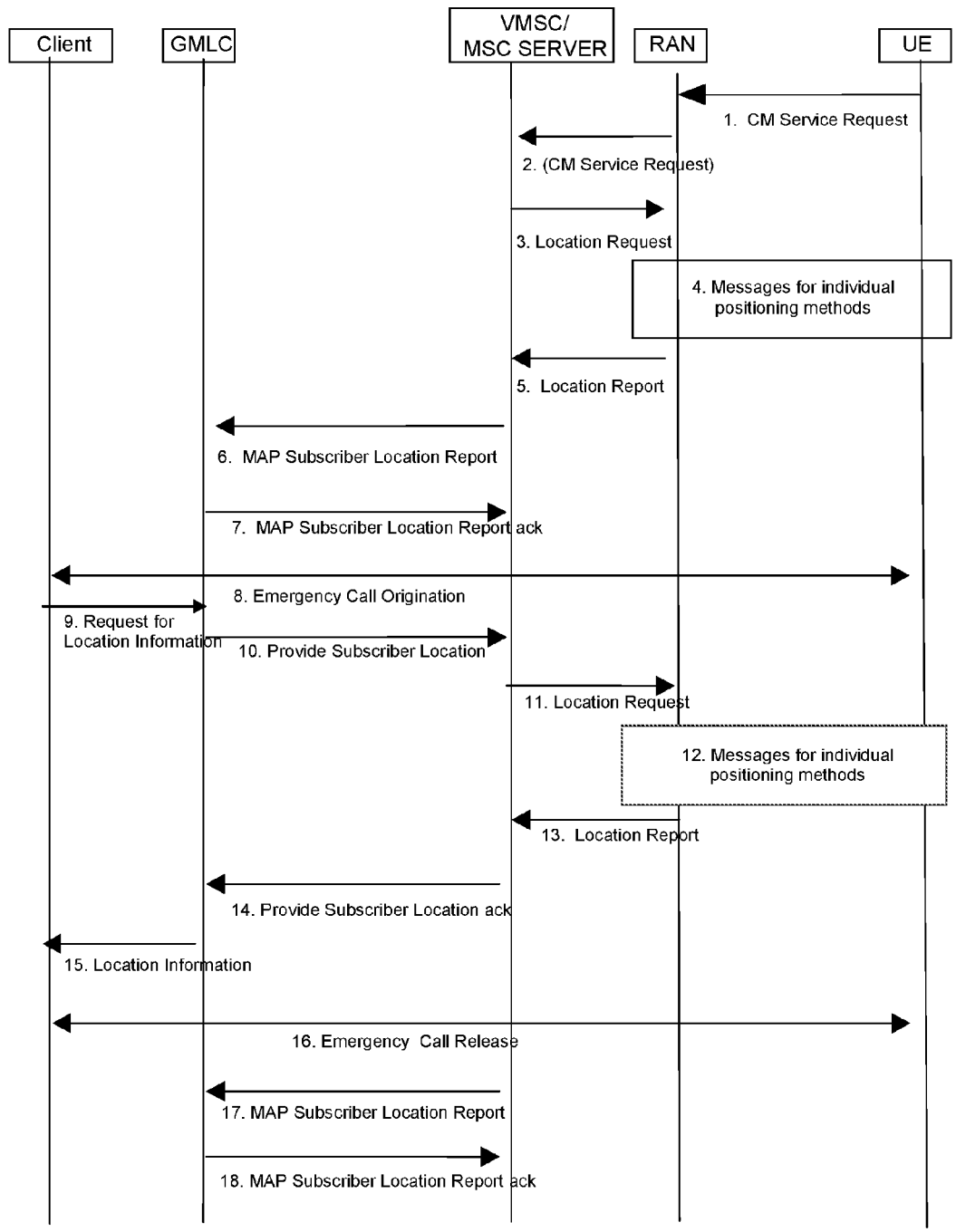
FIG. 1 shows an example emergency call procedure according to 3GPP TS 23.271.
Figure 2:
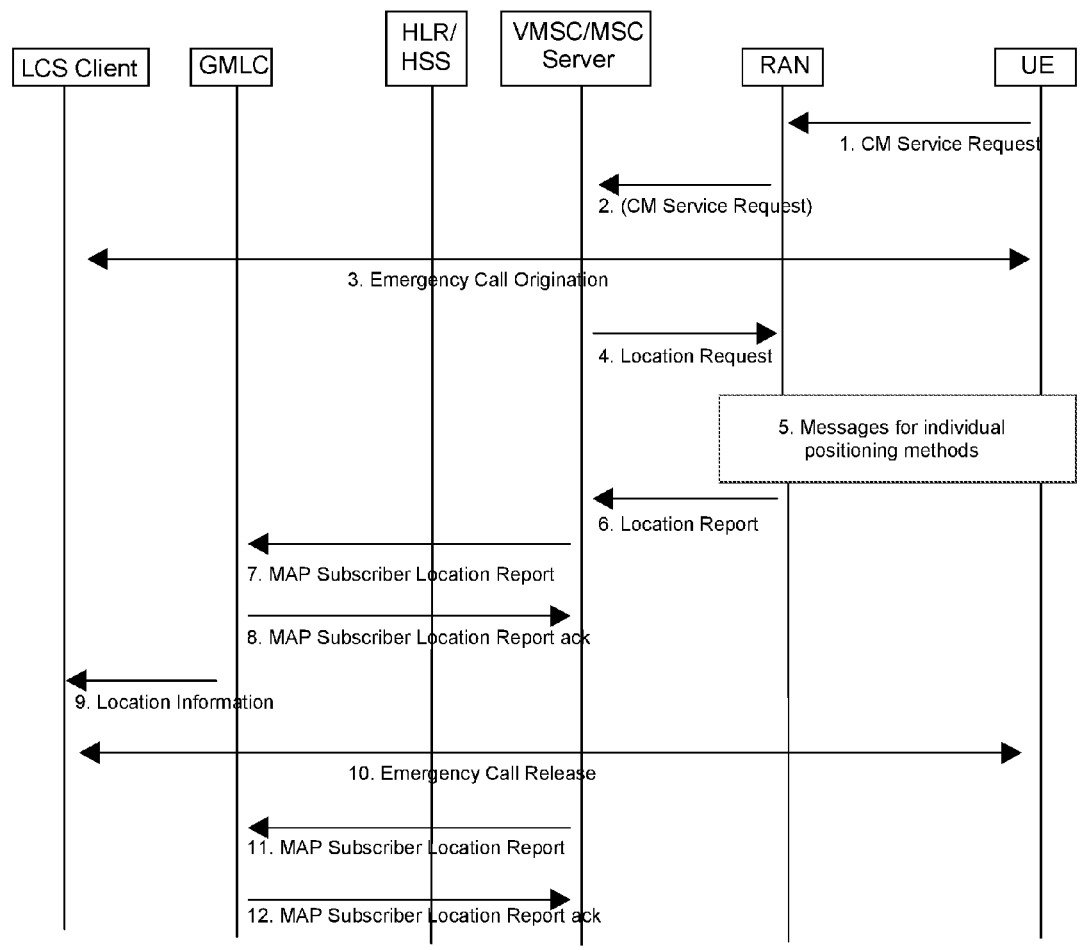
FIG. 2 shows another example emergency call procedure according to 3GPP TS 23.271.
Figure 3:
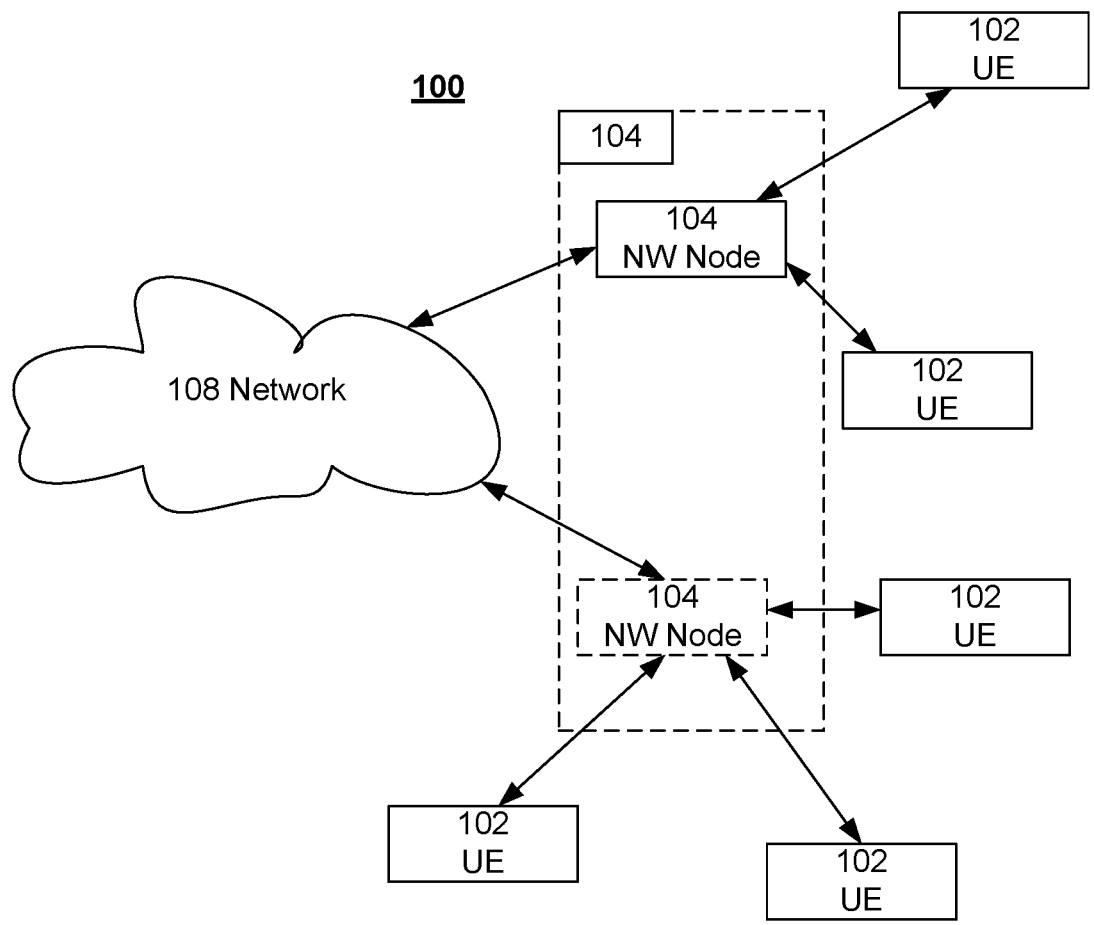
FIG. 3 is a block diagram of a communication system.

FIG. 3 illustrates a block diagram of a communication system 100 for handling emergency calls between a user equipment 102 and system 104 according to an exemplary embodiment. As used herein, "exemplary" merely means an example and as such represents one example embodiment for the invention and should not be construed to narrow the scope of the claimed subject-matter in any way. It will be appreciated that the scope of the claimed subject-matter encompasses many potential embodiments in addition to those illustrated and described herein. Thus, FIG. 3 shall be understood to represent one example of a communication system 100 for handling emergency calls between a UE 102 and a system 104. Numerous other configurations may also be used to implement embodiments that will be described in this detailed description. Again, it should be reminded that, in some embodiments, the system 104 is embodied in one single apparatus, such as one single network node 104. In other embodiments, system 104 employs a distributed approach where the functionality of system 104 is shared among several network nodes 104. A network 108 is also provided. The network 108 may comprise one or more wireline networks, one or more wireless networks, or some combination thereof. In one embodiment, the network 108 comprises a public land mobile network (e.g., a cellular network), such as may be implemented by a network operator (e.g. a cellular access provider). The network 108 may operate in accordance with universal terrestrial radio access network (UTRAN) standards, evolved UTRAN (E-UTRAN) standards, GSM (Global System for Mobile communications) EDGE (Enhanced Data GSM Environment) radio access network (GERAN) standards and/or the like. It will be appreciated, however, that where references herein are made to a network standard and/or terminology particular to a network standard, the references are provided merely by way of example and not by way of limitation.

Figure 4A:
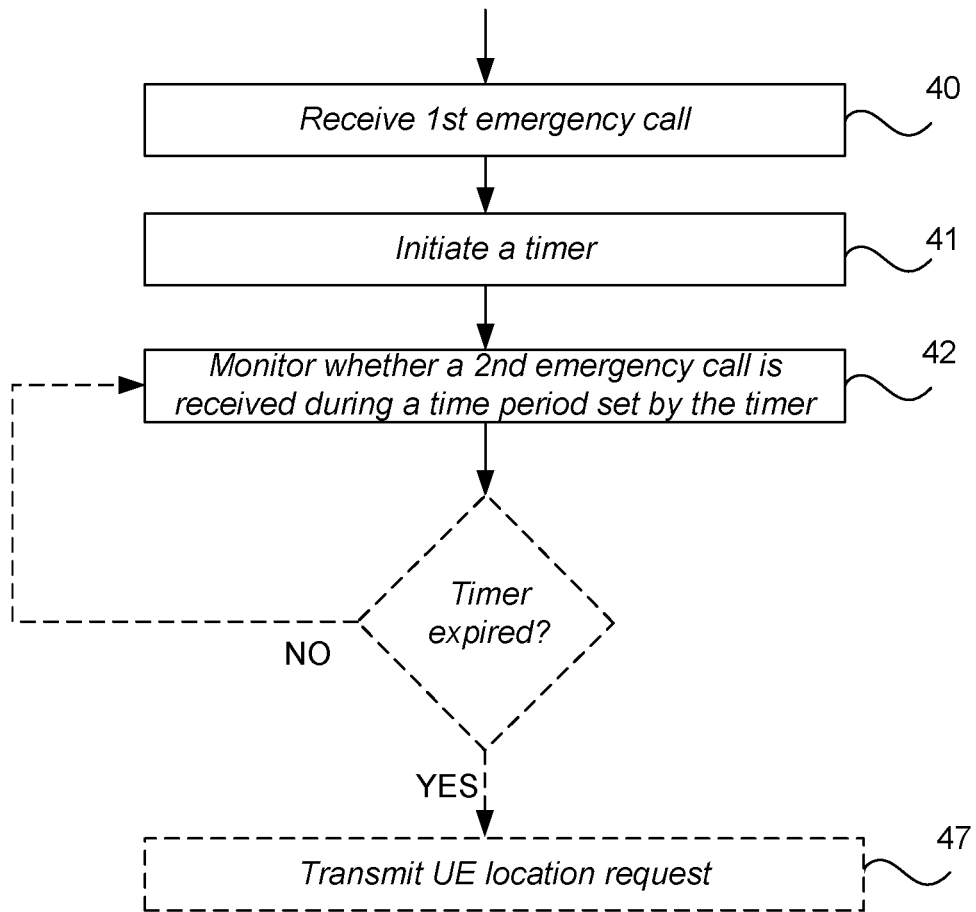
FIG. 4 is a flowchart of a method according to an embodiment.
Figure 4B:
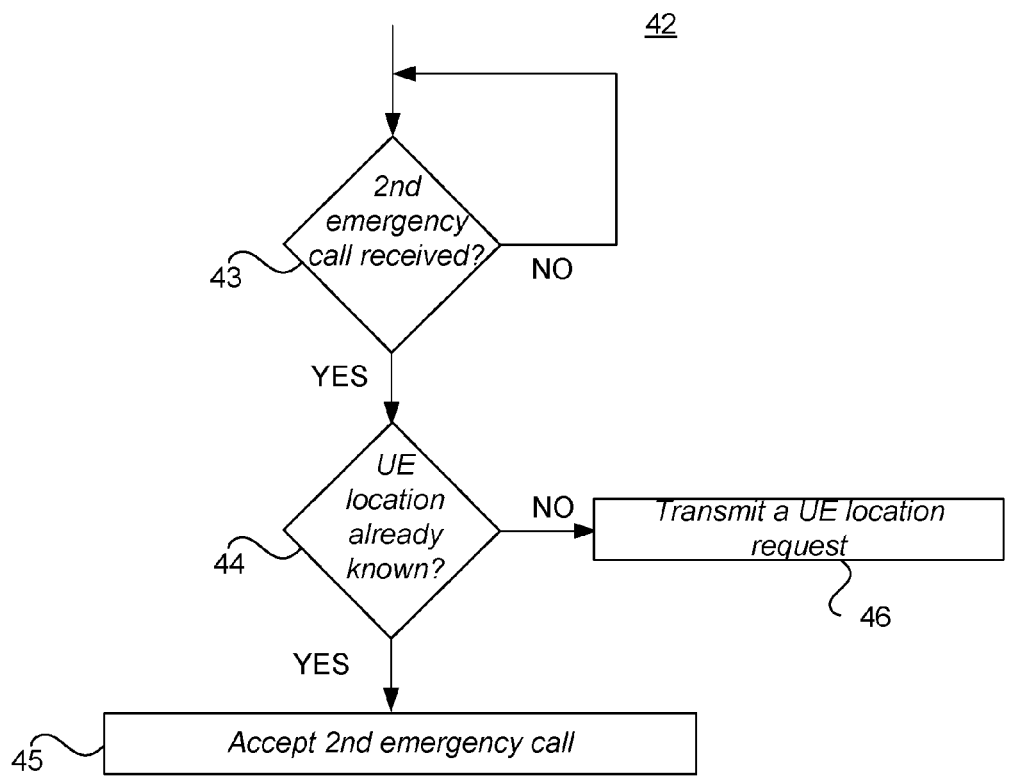

Embodiments of the present disclosure provide for improved handling of emergency calls in various scenarios such as, e.g., in a situation where a second emergency call has to be established following that a first emergency call failed. With reference to FIGS. 4A and 4B, a first embodiment will be described in more detail. The method is performed by, or otherwise executed in, system 104 for accelerating a re-establishment of an emergency call. Herein below, we will use the term "system 104" to ease the reading. However and as described earlier, it should be appreciated that the method may advantageously (though not necessarily) be performed, or otherwise executed in, one single apparatus, such as network node 104. If implemented in one single network node 104, the network node 104 may be a MSC. Alternatively, the method may be performed by, or otherwise executed in, several apparatuses (e.g. in several network nodes 104).

Action 40

The system 104 receives a first emergency call from a UE, e.g. via the RAN. The system 104 may receive this first emergency call according to existing art.

Action 41

The system 104 initiates a start of an emergency call re-establishment timer. This action 41 is done upon receiving the first emergency call. That is, as soon as the system 104 receives the first emergency call in action 40, it will initiate the start of the emergency call re-establishment timer. The reception of the first emergency call thus triggers the start of this emergency call re-establishment timer. Each time the system 104 receives an emergency call, the system 104 will initiate the start of this emergency call re-establishment timer.

The time period set by this emergency call re-establishment timer is set to a relatively small value, e.g. of the order of seconds. For example, the value may be set to 5, 10, 15 or 20 seconds. Thus, the emergency call re-establishment timer may be seen as a temporary timer since it will be used only for a relatively short time period following the reception of an emergency call.

Action 42

During the time period set by the emergency call re-establishment timer, the system 104 monitors whether a second emergency call is received from the same UE.

Whether or not two consecutive emergency calls originate from the same UE could e.g. be identified by the International Mobile Subscriber Identity (IMSI) or by the International Mobile Equipment Identity (IMEI) or any other means.

Actions 43, 44

In response to receiving the second emergency call from the same UE during said time period, the system 104 determines whether a location of said UE is known to the system.

In some embodiments, the system 104 checks whether the location of said UE has already been reported along with said first emergency call. Since it is common that the UE reports its location along with an emergency call, it may be convenient to check whether the location of the UE was indeed reported along with the first emergency call made by the same UE.

Action 45

In response to the location of said UE being known to the system 104, the system 104 accepts the second emergency call. Accepting the second emergency call means that the system 104 is allowed to withdraw from transmitting a UE location request.

For example, in some embodiments, in response to the location of said UE having been reported along with said first emergency call, the system 104 accepts the second emergency call.

Action 46

In response to the location of said UE not being known to the system 104, the system 104 transmits a UE location request for requesting data related to the location of said UE. This UE location request may be transmitted to the RAN, e.g. to a RNC (Radio Network Controller) of the RAN.

In some embodiments, the system 104 transmits the UE location request in response to the location of said UE not having been reported along with said first emergency call.

Action 47

The method may further comprise transmitting a UE location request for requesting said data related to the location of said UE upon expiry of the time period set by the emergency call re-establishment timer. Thus, when the emergency call re-establishment timer times out, the system 104 transmits the UE location request in order to request updated UE location data.

In some embodiments, the method may comprise delaying a transmission of a UE location request for a pre-defined time period after receiving the second emergency call. For example, even if the system 104 accepts the second emergency call in action 45, the system 104 may want to update its information with respect to the UE location at some point in time after the emergency call set-up was finished.

The method described with reference to FIGS. 4A and 4B provides for an accelerated emergency call re-establishment procedure since the second emergency call from a certain UE during the time period set by the emergency call re-establishment timer is accepted directly in situations when it has first been determined that the location of this certain UE is already known to the system. If the location of a certain UE is already known to the system and the emergency call re-establishment timer has not timed out (meaning that too much time has not yet lapsed since the first emergency call was received), then there is no (or at least very little) need for requesting data related to the location of the UE once more. Thus, the second emergency call can be accepted directly. In other words, the second emergency call can be accepted without requesting data related to the location of the UE. For example, in some embodiments it is withdrawn from transmitting any UE location request.

Figure 5:
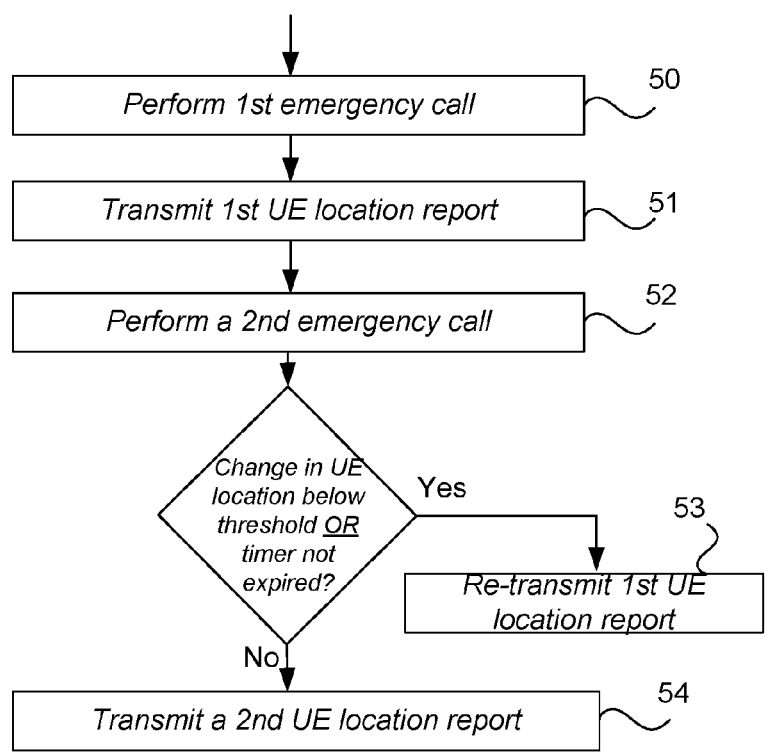
FIG. 5 is a flowchart of a method according to another embodiment.

With reference to FIG. 5, another embodiment will be described in more detail. This method is performed by, or otherwise executed in, a UE 102 for assisting in accelerating a re-establishment of an emergency call.

Action 50

The UE 102 performs, or otherwise establishes, a first emergency call. This emergency call may be established as in the existing art.

Action 51

The UE 102 transmits a first UE location report. This first UE location report may be done conditionally on request, e.g. on request from a CN.

It should be appreciated that the UE 102 may need to determine, or otherwise calculate, its location before it can transmit the first UE location report. As mentioned earlier, there exist various methods for determining the location of the UE.

Action 52

The UE 102 performs, or otherwise establishes, a second emergency call. This second emergency call may be performed due to the fact that the first emergence call failed, e.g. due to bad radio conditions.

Action 53

In response to a determination that a change in the UE location since the transmission of said first UE location report is below a threshold value, the UE re-transmits the first UE location report. The threshold value may, for example, be 59 meters, which is the 67% accuracy requirement for E-911 in the U.S. Other values are of course also conceivable.

Alternatively, in response to a determination that a time period set by a timer has not expired (wherein the time period set by the timer is set upon transmission of said first location report), the UE re-transmits the first UE location report. The time period set by the timer may e.g. be 5, 10, 15 or 20 seconds.

Action 54

Otherwise, i.e. in response to a determination that a change in a UE location since the transmission of the first UE location report is equal to or above the threshold value or, alternatively, in response to a determination that a time period set by a timer has expired, the UE transmits a second UE location report is transmitted (e.g. to the RAN)

Before the UE can transmit its second UE location report, the UE may have to re-determine or re-calculate its position. As mentioned earlier, there exist various methods for determining the location of the UE. In this action, it would be recommended to utilize a positioning method that is relatively quick in order to reduce the time it takes to establish the location of the UE. In some situations, it may therefore be advantageous to utilize RF fingerprinting or AECID positioning instead of e.g. GPS positioning. For more information about the respective positioning methods, see chapter 32 of the earlier-mentioned reference book "Positioning in LTE, Handbook of Position Location, Theory Practice and Advances: A Handbook for Engineers and Academics" written by Ari Kangas, Iana Siomina, and Torbjörn Wigren and published by IEEE Press & Wiley in 2012". Note that at this stage it may be sufficient with a coarse location determination; priority should generally be given to assist in accelerating the emergency call set-up.

The method described with reference to FIG. 5 provides for an accelerated emergency call re-establishment procedure by only transmitting the second UE location report when this is deemed necessary. Otherwise, in situations when the UE has not changed its location above a threshold value (meaning that the UE location change is relatively small since the transmission of the first UE location report) or in situations when little time has elapsed since the first emergency call (meaning that the UE cannot possibly have changed its location very much) then the UE can simply re-transmit its previous first UE location report. By refraining from transmitting the second UE location report in such situations, the overall delay for emergency call re-establishment procedures can be reduced.

Figure 6:
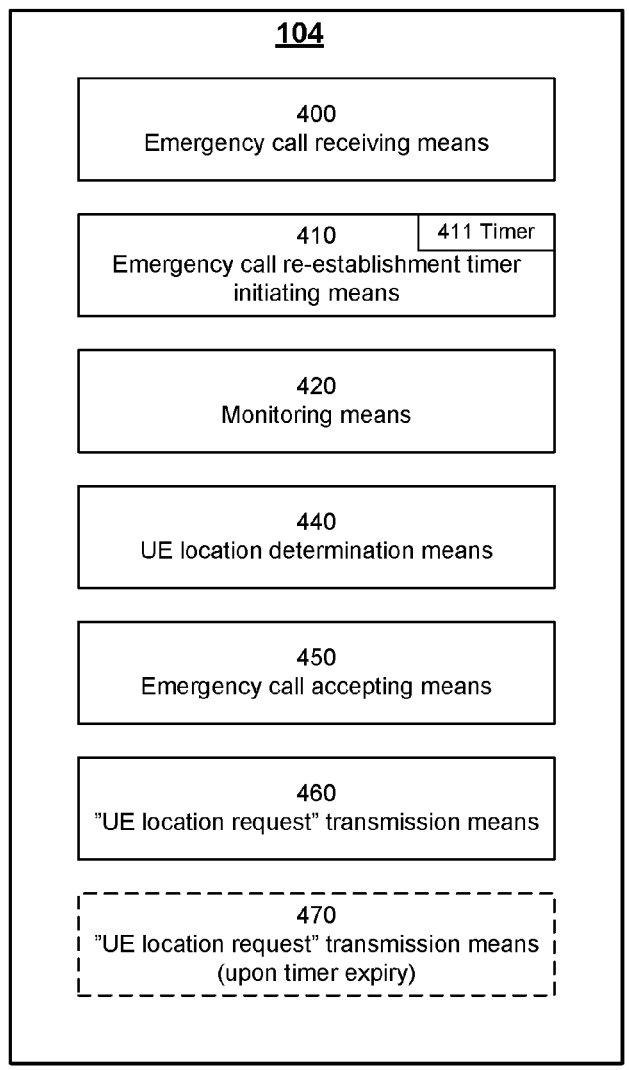
FIGS. 6-8 show various embodiments of a system.

Turning now to FIG. 6, a first embodiment of system 104 will be described in more detail. The system 104 is configured to perform, or otherwise execute, the method described with respect to FIGS. 4A and 4B. In this exemplary embodiment, system 104 is implemented in one single network node 104, such as a MSC. Means 400 adapted to receive a first emergency call from a UE are provided. Also, means 410 adapted to initiate a start of an emergency call re-establishment timer 411 upon receiving said first emergency call are provided. Moreover, there are means 420 adapted to monitor whether a second emergency call is received from the same UE during a time period set by the emergency call re-establishment timer 411. Furthermore, there are means 440 adapted to determine whether a location of said UE is known to the system. For example said means 440 may be adapted to determine this in response to receiving a second emergency call from the same UE during said time period. Furthermore, means 450 adapted to accept the second emergency call in response to the location of said UE being known to the system are provided. Still further, there are means 460 adapted to transmit, in response to the location of said UE not being known to the system, a UE location request for requesting data related to the location of said UE. Optionally, means 470 adapted to transmit, upon expiry of the time period set by the emergency call re-establishment timer, a UE location request for requesting data related to the location of said UE are also provided.

The means denoted 440 may be further adapted to determine whether the location of said UE has already been reported along with said first emergency call in response to receiving the second emergency call from the same UE during said time period. The means 450 may be further adapted to accept the second emergency call in response to the location of said UE having been reported along with said first emergency call. Also, the means 460 may be adapted to transmit, in response to the location of said UE not having been reported along with said first emergency call, a UE location request for requesting said data related to the location of said UE.

The means denoted 450 may be further adapted to withdraw from transmitting a UE location request. Additionally, or alternatively, the means 450 may be adapted to delay a transmission of a UE location request for a pre-defined time period after the second emergency call is received.

Figure 7:
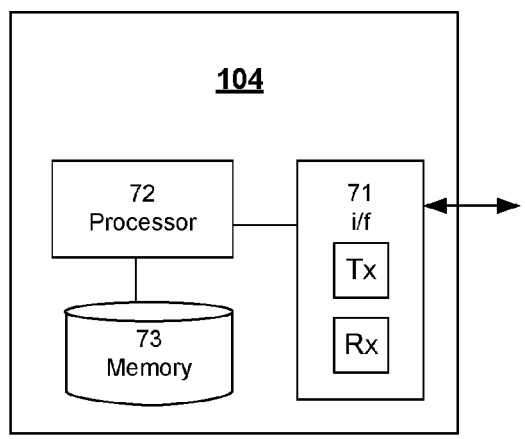

With reference to FIG. 7, another example embodiment of system 104 is shown. The system 104 comprises a communications interface 71, a processor 72 and a memory 73. The communications interface 71 may comprise a transmitter (Tx) and a receiver (Rx). Alternatively, the communications interface may comprise a transceiver.

The memory 73 stores computer program code, which, when run in the processor 72 causes the system 104 to: receive a first emergency call from a UE; initiate a start of an emergency call re-establishment timer upon receiving said first emergency call; monitor whether a second emergency call is received from the same UE during a time period set by the emergency call re-establishment timer; in response to receiving the second emergency call from the same UE during said time period determine whether a location of said UE is known to the system; and in response to the location of said UE being known to the system accept the second emergency call; otherwise, i.e. in response to the location of said UE not being known to the system, transmit a UE location request for requesting data related to the location of said UE.

The memory 73 may also store computer program code, which, when run in the processor 72 causes the system 104 to: in response to receiving the second emergency call from the same UE during said time period determine whether the location of said UE has already been reported along with said first emergency call; and in response to the location of said UE having been reported along with said first emergency call accept the second emergency call; otherwise, i.e. in response to the location of said UE not having been reported along with said first emergency call, transmit the UE location request for requesting said data related to the location of said UE.

The memory 73 may also store computer program code, which, when run in the processor 72 causes the system 104 to transmit a UE location request for requesting said data related to the location of said UE upon expiry of the time period set by the emergency call re-establishment timer.

The memory 73 may also store computer program code, which, when run in the processor 72 causes the system 104 to withdraw from transmitting a UE location request when accepting the second emergency call.

The memory 73 may also store computer program code, which, when run in the processor 72 causes the system 104 to delay a transmission of a UE location request for a pre-defined time period after receiving the second emergency call.

Figure 8:
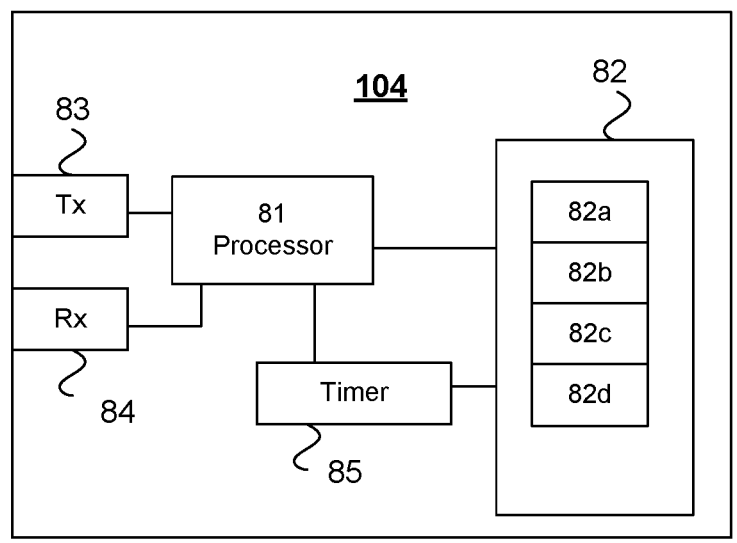

With reference to FIG. 8, an alternative embodiment of system 104 will be described. In this example, the system 104 is embodied in one single apparatus, e.g. a network node 104. The network node may be a MSC. The system 104 may comprise a processor 81, various modules 82, a transmitter (Tx) 83 and a receiver (Rx) 84. The transmitter 83 and the receiver 84 may alternatively be implemented as a single transceiver. In this example implementation, the receiver 84 may be configured to receive a first emergency call from a UE. Upon receiving the first emergency call, an emergency call re-establishment module 82a is configured to initiate a start of an emergency call re-establishment timer 85. A time period, which may be pre-defined, is set by the emergency call re-establishment timer 85. As described earlier, the value of this time period is typically relatively small, e.g. of the order of seconds (e.g. 15 seconds). Furthermore, there is a monitoring module 82b for monitoring whether a second emergency call is received (by the receiver 84) from the same UE during the time period set by the emergency call re-establishment timer. Moreover, there is a determination module 82c for determining whether a location of said UE is known to the system 104. The determination module 82c is configured to perform its determination in response to that receiver 84 receives the second emergency call from the same UE during said time period. There is also an emergency call handler module 82d. The emergency call handler module 82d is configured to accept the second emergency call in response to a determination by the determination module 82c that the location of said UE is known to the system 104. The emergency call handler module 82d may be further configured to reject said second emergency call in response to a determination by the determination module 82c that the location of said UE is not known to the system 104. This rejection may be valid until the system 104 knows the location (i.e. position) of the UE. The transmitter 83 is configured to transmit UE location requests for requesting data related to the location of UEs. For example, the transmitter 83 may be configured to transmit a UE location request for requesting data related to the location of the earlier-mentioned UE in response to a determination by the determination module 82c that the location of said UE is not known to the system 104.

Figure 9:
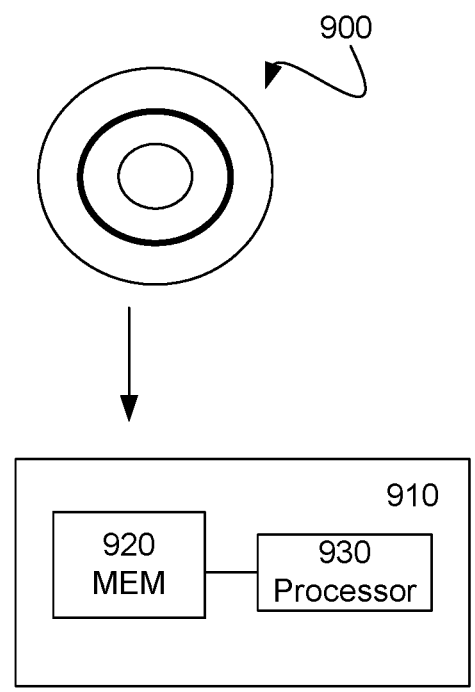
FIG. 9. shows an example embodiment in the form of a computer program

Turning now to FIG. 9, yet another embodiment is disclosed. FIG. 9 illustrates a computer program comprising instructions which, when executed on at least one processor 930 of at least one apparatus 910, will cause the at least one apparatus 910 to:

receive a first emergency call from a UE;
initiate a start of an emergency call re-establishment timer upon receiving said first emergency call;
monitor whether a second emergency call is received from the same UE during a time period set by the emergency call re-establishment timer; and
in response to receiving the second emergency call from the same UE during said time period also determine whether a location of said UE is known to the system; and
in response to the location of said UE being known to the system accepting the second emergency call; otherwise
in response to the location of said UE not being known to the system transmitting a UE location request for requesting data related to the location of said UE.

A carrier may comprise the above-mentioned computer program. The carrier may be a computer readable storage medium 900. Alternatively, the carrier may be one of an electronic signal, an optical signal, or a radio signal. In some embodiments, the at least one apparatus 910 may be embodied as one or several network nodes 104.

Figure 10:
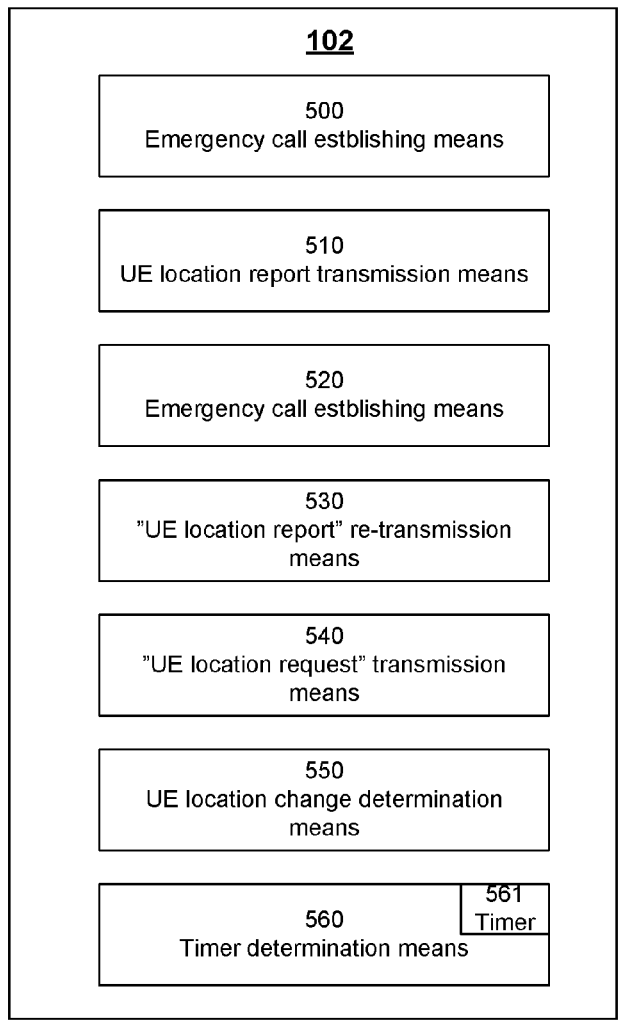
FIGS. 10-12 show various embodiments of a UE.
Figure 11:
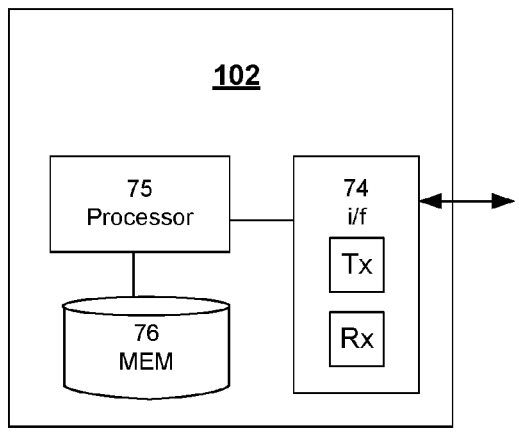

An embodiment of a UE 102 for assisting in accelerating a re-establishment of an emergency call will now be described in conjunction with FIG. 10. The UE comprises means 500 adapted to perform a first emergency call. There are also means 510 adapted to transmit a first UE location report, e.g. to a RAN. For example, the means 510 may be configured to transmit the first UE location report upon request, e.g. upon request from the CN. The UE 102 also comprises means 520 adapted to perform a second emergency call. In some embodiments, the means denoted 500 are configured to perform all emergency calls. Hence, and as is readily appreciated, one single means 500 could handle all emergency calls, i.e. a first, a second, and optionally more emergency calls. It is not necessary that there are several, i.e. two or more, means for handling the emergency call establishment. There are also provided means 550 adapted to determine whether a change in UE location (since a transmission of the first emergency call) is below a threshold value. Additionally, or alternatively, there are means 560 adapted to determine whether a time period set by a timer 561 has expired, wherein the time period set by the timer is set upon transmission of a first location report. Furthermore, the UE comprises means 530 adapted to re-transmit the first UE location report in response to a determination that a change in UE location (since the transmission of a first emergency call) is below said threshold value or, alternatively, in response to a determination that said time period set by the has not expired. Moreover, the UE 102 comprises means 540 adapted to transmit a second UE location report in response to a determination that a change in UE location since a transmission of a first emergency call is equal to or above said threshold value or in response to a determination that said time period set by the timer has expired.

With reference to FIG. 7, another example embodiment of UE 102 is shown. The UE 102 comprises a communications interface 74, a processor 75 and a memory 76. The communications interface 74 may comprise a transmitter (Tx) and a receiver (Rx). Alternatively, the communications interface may comprise a transceiver.

The memory 76 stores computer program code, which, when run in the processor 75 causes the UE 102 to: perform a first emergency call via the communications interface 74; transmit a first UE location report via the communications interface 74; perform a second emergency call via the communications interface 74; re-transmit the first UE location report via the communications interface 74 in response to a determination that a change in UE location since the transmission of the first UE location report is below a threshold value or in response to a determination that a time period set by a timer has not expired; otherwise transmit a second UE location report via the communications interface 74.

Figure 12:
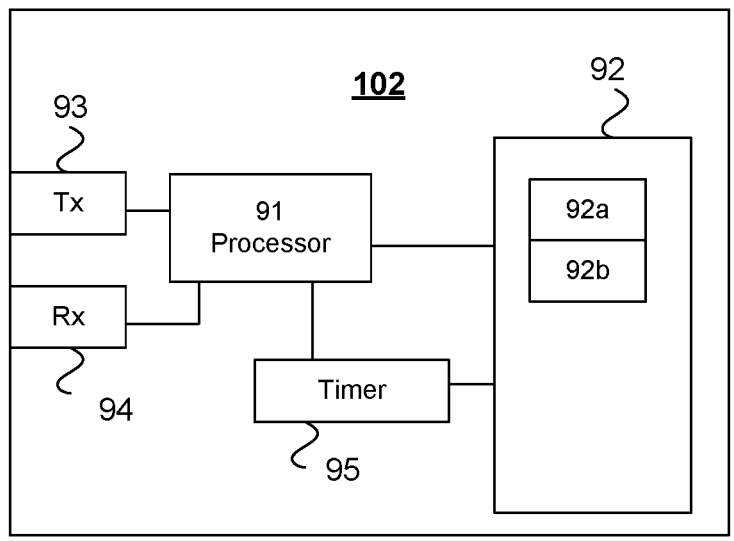

With reference to FIG. 12, an alternative embodiment of UE 102 will be described. The UE 102 may comprise a processor 91, various modules 92, a transmitter (Tx) 93 and a receiver (Rx) 94. The transmitter 93 and the receiver 94 may alternatively be implemented as a single transceiver. The transmitter 93 may be configured to perform a first emergency call. The transmitter 93 may be further configured to transmit a first UE location report. Furthermore, the transmitter 93 may be configured to transmit a second emergency call. A UE location determination module 92a is also provided for determining whether a change in UE location (since a transmission of the first emergency call) is below a threshold value. Moreover, a timer expiry determination module 92b is provided for determining whether a time period set by a timer 95 has expired. The time period set by the timer 95 is typically, but not necessarily, set upon transmission of a first location report. Furthermore, the transmitter 93 is further configured to re-transmit the first UE location report in response to the UE location determination module 92a determining that a change in UE location since a transmission of a first emergency call is below said threshold value or in response to the timer expiry determination module 92b determining that said time period set by the has not expired. Moreover, the transmitter 93 is configured to transmit a second UE location report in response to the UE location determination module 92a determining that a change in UE location since a transmission of a first emergency call is equal to or above said threshold value or in response to the timer expiry determination module 92b determining that said time period set by the timer has expired.

Figure 13:
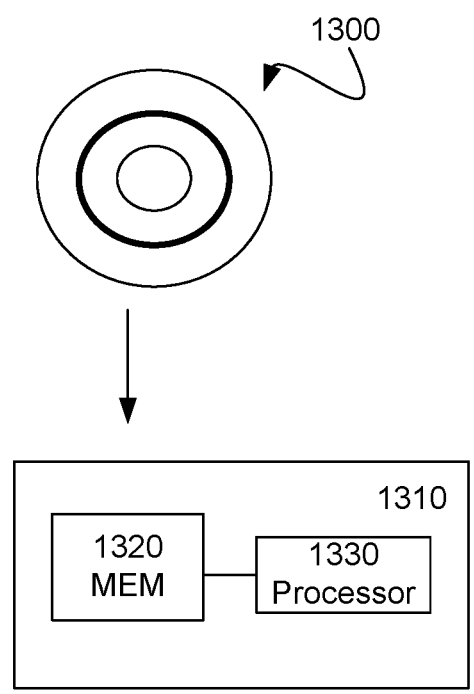
FIG. 13 shows an example embodiment in the form of a computer program.

Turning now to FIG. 13, yet another embodiment is disclosed. FIG. 13 illustrates a computer program comprising instructions which, when executed on at least one processor 1330 of at least one apparatus 1310, will cause the at least one apparatus 1310 to:

perform a first emergency call;
transmit a first UE location report;
perform a second emergency call;
re-transmit the first UE location report in response to a determination that a change in UE location since the transmission of the first UE location report is below a threshold value or in response to a determination that a time period set by a timer has not expired; otherwise transmit a second UE location report.

A carrier may comprise the above-mentioned computer program. The carrier may be a computer readable storage medium 1300. Alternatively, the carrier may be one of an electronic signal, an optical signal, or a radio signal.

In the detailed description hereinabove, for purposes of explanation and not limitation, specific details are set forth such as particular architectures, interfaces, techniques, etc. in order to provide a thorough understanding of various embodiments. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein may represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

The invention claimed is:

1. A method performed by a system for accelerating a re-establishment of an emergency call, the method comprising:
   receiving a first emergency call from a User Equipment (UE);
   initiating a start of an emergency call re-establishment timer upon receiving said first emergency call;
   monitoring whether a second emergency call is received from the same UE during a time period set by the emergency call re-establishment timer; and
   in response to receiving the second emergency call from the same UE during said time period determining whether a location of said UE is known to the system; and
   in response to the location of said UE being known to the system accepting the second emergency call; otherwise
   in response to the location of said UE not being known to the system transmitting a UE location request for requesting data related to the location of said UE.

2. The method according to claim 1, comprising:
   in response to receiving the second emergency call from the same UE during said time period determining whether the location of said UE has already been reported along with said first emergency call; and
   in response to the location of said UE having been reported along with said first emergency call accepting the second emergency call; otherwise
   in response to the location of said UE not having been reported along with said first emergency call transmitting the UE location request for requesting said data related to the location of said UE.

3. The method according to claim 1, further comprising, upon expiry of the time period set by the emergency call re-establishment timer:
   transmitting a UE location request for requesting said data related to the location of said UE.

4. The method according to claim 1, wherein accepting the second emergency call comprises withdrawing from transmitting a UE location request.

5. The method according to claim 1, comprising:
   delaying a transmission of a UE location request for a pre-defined time period after receiving the second emergency call.

6. A system for accelerating a re-establishment of an emergency call, the system comprising:
   means adapted to receive a first emergency call from a User Equipment (UE);
   means adapted to initiate a start of an emergency call re-establishment timer upon receiving said first emergency call;
   means adapted to monitor whether a second emergency call is received from the same UE during a time period set by the emergency call re-establishment timer; and
   means adapted to determine whether a location of said UE is known to the system in response to receiving a second emergency call from the same UE during said time period;
   means adapted to accept the second emergency call in response to the location of said UE being known to the system; and
   means adapted to transmit, in response to the location of said UE not being known to the system, a UE location request for requesting data related to the location of said UE.

7. The system according to claim 6, comprising:
   means adapted to determine whether the location of said UE has already been reported along with said first emergency call in response to receiving the second emergency call from the same UE during said time period;
   means adapted to accept the second emergency call in response to the location of said UE having been reported along with said first emergency call; and
   means adapted to transmit, in response to the location of said UE not having been reported along with said first emergency call, a UE location request for requesting said data related to the location of said UE.

8. The system according to claim 6, comprising:
   means adapted to transmit, upon expiry of the time period set by the emergency call re-establishment timer, a UE location request for requesting data related to the location of said UE.

9. The system according to claim 6, comprising:
   means adapted to withdraw from transmitting a UE location request.

10. The system according to claim 6, comprising:
    means adapted to delay a transmission of a UE location request for a pre-defined time period after the second emergency call is received.

11. A method performed by a User Equipment (UE) for assisting in accelerating a re-establishment of an emergency call, the method comprising:
    performing a first emergency call;
    transmitting a first UE location report;
    performing a second emergency call; and
    re-transmitting the first UE location report in response to a determination that a change in a UE location since the transmission of said first UE location report is below a threshold value or in response to a determination that a time period set by a timer has not expired, wherein the time period set by the timer is set upon transmission of said first location report; otherwise transmitting a second UE location report.

* * * * *